United States Patent
Taya

(10) Patent No.: US 7,769,114 B2
(45) Date of Patent: Aug. 3, 2010

(54) MULTI-MODE RECEIVER CIRCUIT FOR DEALING WITH VARIOUS MODULATION SYSTEMS AND SIGNAL FORMATS

(75) Inventor: Takashi Taya, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 585 days.

(21) Appl. No.: 11/822,584

(22) Filed: Jul. 9, 2007

(65) Prior Publication Data

US 2008/0013651 A1    Jan. 17, 2008

(30) Foreign Application Priority Data

Jul. 13, 2006    (JP) ............... 2006-192903

(51) Int. Cl.
*H04L 27/06* (2006.01)
*H04B 17/02* (2006.01)

(52) U.S. Cl. ...................... 375/340; 455/133

(58) Field of Classification Search ................ 375/316, 375/340, 349–350; 455/133–135, 303, 553.1
See application file for complete search history.

(56) References Cited

U.S. PATENT DOCUMENTS 6,192,070 B1 *  2/2001  Poon et al. ................. 375/222
6,356,581 B1 *  3/2002  Nguyen et al. ............. 375/148
6,452,964 B1 *  9/2002  Yoshida ..................... 375/222
6,721,371 B1 *  4/2004  Barham et al. ............. 375/316
6,970,681 B2 * 11/2005  Darabi et al. ................ 455/73
7,016,661 B2 *  3/2006  Gorday et al. ............. 455/309
7,183,949 B2 *  2/2007  Park ............................. 341/61
7,197,291 B2 *  3/2007  Mach et al. ................. 455/303
2006/0246942 A1 * 11/2006  Ramachandran et al. . 455/553.1

FOREIGN PATENT DOCUMENTS

JP    11-284554    10/1999
JP    2002-368829  12/2002

* cited by examiner

*Primary Examiner*—Khanh C Tran
(74) *Attorney, Agent, or Firm*—Studebaker & Brackett PC; Donald R. Studebaker

(57) ABSTRACT

In a receiver set, a shared receiver receives a signal formed according to one of various modulation or communication systems to output a received signal. A signal intensity detector detects the electric power value, or absolute value of the amplitude, of the received signal to output a detected signal. A determiner compares the magnitude of the detected signal with threshold voltages, and generates control signals to output them to switches. The switches are operated in response to the respective control signals fed to the switches so that the received signal is selectively fed to demodulators. The demodulators demodulate the received signal according to a receiving system corresponding to the modulation or transmission systems to output demodulated signals.

8 Claims, 7 Drawing Sheets

MULTI-MODE RECEIVER CIRCUIT FOR DEALING WITH VARIOUS MODULATION SYSTEMS AND SIGNAL FORMATS

BACKGROUND OF THE INVENTION

1. Field of the Invention

The present invention relates to a multi-mode receiver circuit, and more particularly to a multi-mode receiver set for use in radio equipment which can deal with various kinds of modulation systems, signal formats, and coding systems.

2. Description of the Background Art

For integrated circuit (IC) applications, digital processing circuits fabricated on a semiconductor substrate have been reduced in horizontal and vertical dimensions to meet the high-density integration requirement. Because of this, analog circuits and radio-frequency circuits have relatively been increased in geometrical area and manufacturing cost. For that reason, multi-mode receiver circuits for use in radio equipment, which receive signals by adaptively switching modulation systems or signal formats which deal with a plurality of communication systems are designed to share an analog circuit and a high-frequency circuit with those systems or formats in such a fashion that a demodulator for demodulating a received signal by digital processing has its input port at which the received signal is split according to communication systems to demodulate split signals. In this manner, the entire area and cost of the receiver circuits can be reduced. This concept itself is known as software radio or reconfigurable radio circuit.

One of such multi-mode receiver circuits for use in radio equipment which deals with plural kinds of modulation systems and signal formats has been proposed in Japanese Patent Laid-Open Publication No. 284554/1999, by way of example.

The above Japanese '554 publication discloses a multi-mode radio transmission set, which is provided with a plurality of antennas, a high-frequency signal processing circuit, wave detectors and a signal-intensity measuring circuit, which are adaptively switched with switches so as to establish communications. Particularly, in the multi-mode radio set, high-frequency signals, i.e. radio signals, are received by the antennas to the high-frequency signal processing circuits, and are in turn detected and demodulated with the PHS (Personal Handy-phone System) wave detector and PDC (Personal Digital Cellular) wave detector. In the radio transmission set taught by the Japanese '554 publication, either of the two demodulated signals from the wave detectors is output through the switch to a circuit internal to the radio set according to the signal intensities measured with the signal intensity measuring circuits.

Another Japanese Patent Laid-Open Publication No. 2002-368829 discloses a technique in which an antenna and a high-frequency circuit are shared and, through a switch disposed on the output side of the shared section, are connected to either an ASK (Amplitude Shift Keying) demodulator or a QPSK (Quadrature Phase Shift Keying) demodulator. Particularly, this Japanese '829 publication discloses that the electric power of a received signal from the antenna is measured within the sharing section to determine a modulation system used, and the received signal is modulated by either of the two ASK and QPSK demodulators selected with the switch.

Well, multi-mode receiver circuits for use in radio equipment are required to, under the circumstances in which there are possibly input signals in various modulation systems and signal formats, appropriately deal with a type of high-frequency signal that is input at that time. Generally, high-frequency circuits are high in power consumption, large in occupied volume, and costly. Because of this, it is undesirable that the multi-mode receiver circuit be provided with a plurality of high-frequency circuits dedicated to deal with respective modulation systems and signal formats.

Hence, in multi-mode receiver circuits, it would be useful to share a single high-frequency circuit with various modulation systems and signal formats. However, multi-mode receiver circuits are required to determine the modulation system and signal format of an input high-frequency signal and demodulate the received signal properly to the system and format thus determined. Multi-mode receiver circuits are also desired to compare the results of modulation with one another and output optimum one of the results. That causes multi-mode receiver circuits to be complicated in processing such as comparison of digital signals. Multi-mode receiver circuits therefore have difficulties in circuit scale being increased or processing delay being increased. The difficulties will hereinafter be described in detail.

In the multi-mode receiver circuit disclosed in the aforementioned Japanese '829 publication, an antenna for receiving a high-frequency signal is connected with a high-frequency circuit, which is in turn connected to a plurality of demodulators, e.g. a demodulator for BPSK (Binary Phase Shift Keying) modulation, a demodulator for QPSK modulation, and a demodulator for ASK modulation. The three demodulators corresponding to a plurality of modulation systems share the high-frequency circuit that includes an intermediate-frequency filter and an intermediate-frequency amplifier.

Assume that the intensity of a received signal, which is required for the three demodulators to output a demodulated signal while maintaining intended quality, increases in order of BPSK, QPSK, and ASK demodulators. In the multi-mode receiver circuit, when the intensity of a received signal from the antenna is great, i.e. when the ASK demodulator provides the signal intensity of a received signal such that it can output a demodulated signal while maintaining intended quality, each of the three demodulators can output a demodulated signal while maintaining intended communication quality regardless of which of BPSK, QPSK and ASK modulations the modulation system of the received signal is.

On the other hand, when the intensity of a received signal from the antenna is small, i.e. when only the BPSK demodulator provides the intensity of a received signal such that it can output a demodulated signal while maintaining intended quality, if the modulation system of the received signal is BPSK modulation, the BPSK demodulator can output a demodulated signal while maintaining intended communication quality. The QPSK demodulator or ASK demodulator, however, will output a demodulated signal without maintaining intended communication quality.

Even when the intensity of a received signal from the antenna is great or small, for example, a received signal whose modulation system is ASK modulation is input not only to the ASK demodulator but also to the BPSK and QPSK demodulators. That is, the received signal is input to all of the three demodulators. As a result, the two demodulators other than appropriate one will consume electric power wastefully. Even when a signal modulated according to a different modulation system is input, three demodulators consume electric power by demodulation process. However, since the demodulation process cannot produce intended demodulated signals, unnecessary demodulated signals will be output.

Now, consider the problems found in the aforementioned Japanese '554 and '829 publications. The '554 publication, as described above, discloses that demodulated signals are output from the PHS and PDC wave detectors, and one of the two signals is output from the switch according to the signal intensities. In the technique disclosed in the '554 publication, however, the demodulation operation is always performed on the two signals provided from the antenna. As with the aforementioned case, this can cause wasteful power consumption.

On the other hand, the aforementioned '829 publication, as previously described, discloses that the electric power of a received signal from the antenna is measured to determine a modulation system used, and according to the modulation system, either the ASK or QPSK demodulator is selected. In the technique disclosed in the 829 publication, however, in order to determine whether the received signal from the antenna is an ASK or QPSK modulated wave, a variation in power value or amplitude of the received signal is monitored during a period of time equal to or more than one period of the base band signal.

Accordingly, the power consumption of the determiner is considered to be increased. A variation in power value or amplitude of a QPSK modulated wave is small, so that noise, when involved in the QPSK modulated wave, renders the configuration disclosed in the '829 publication to present a strong possibility that the modulation system of a received signal will be determined in error. For example, a received signal will erroneously be switched over to the ASK demodulator, rather than to the QPSK demodulator. Such a possibility of the modulation system being determined in error will take place without regard to the magnitude of the electric power value, or absolute value of the amplitude, of a received signal.

SUMMARY OF THE INVENTION

It is an object of the present invention to provide a multi-mode receiver circuit that is capable of preventing wasteful demodulation and decoding operations to reduce power consumption, while maintaining intended communication quality.

In accordance with the present invention, a multi-mode receiver circuit comprises a shared receiver for receiving an input signal formed according to one of a plurality of modulation and communication systems to output a received signal; a detector for detecting a signal intensity of the received signal to output a detected signal representative of the signal intensity; a determiner having at least a first threshold value and a second threshold value set for comparing the detected signal with the first and second threshold values to output a control signal corresponding to a result of comparison, the second threshold value being higher than the first threshold value; a first switch operative in response to the control signal for selectively conducting the received signal to output the received signal or intercepting the received signal; a second switch operative in response to the control signal for selectively conducting the received signal to output the received signal or intercepting the received signal; a first demodulator interconnected to the first switch for demodulating the received signal, when output from the first switch, to output a demodulated signal; and a second demodulator interconnected to the second switch for demodulating the received signal, when output from the second switch, to output a demodulated signal. The first and second threshold values are set to values corresponding to the signal intensities employed when the first and second demodulators output the demodulated signals having an intended communication quality, respectively. When the signal intensity represented by the detected signal falls between the first threshold value and the second threshold value, the determiner outputs the control signal causing the first switch to conduct and the second switch to intercept the received signal. When the signal intensity represented by the detected signal exceeds the second threshold value, the determiner outputs the control signal causing the first switch and the second switch to conduct the received signal. The first and second demodulators thereby output the demodulated signal having the intended communication quality maintained.

Further in accordance with the present invention, a multi-mode receiver circuit comprises a shared receiver for receiving an input signal formed according to one of a plurality of modulation and communication systems to output a received signal; a demodulator for demodulating the received signal to output a demodulated signal; a detector for detecting a signal intensity of the received signal to output a detected signal representative of the signal intensity; a determiner having at least a first threshold value and a second threshold value set for comparing the detected signal with the first and second threshold values to output a control signal corresponding to a result of comparison, the second threshold value being higher than the first threshold value; a first switch operative in response to the control signal for selectively conducting the demodulated signal to output the demodulated signal or intercepting the demodulated signal; a second switch operative in response to the control signal for selectively conducting the demodulated signal to output the demodulated signal or intercepting the demodulated signal; a first decoder interconnected to the first switch for decoding the demodulated signal conducted by the first switch according to a first decoding system corresponding to a first coding system and first one of the communication systems to output a decoded signal; and a second decoder interconnected to the second switch for decoding the demodulated signal conducted by the second switch according to a second decoding system corresponding to a second coding system and second one of the communication systems to output a decoded signal. The first and second threshold values are set to values corresponding to the signal intensities employed when the first and second decoders output the decoded signals having an intended communication quality, respectively. When the signal intensity represented by the detected signal falls between the first threshold value and the second threshold value, the determiner outputs the control signal causing the first switch to conduct and the second switch to intercept the demodulated signal. When the signal intensity represented by the detected signal exceeds the second threshold value, the determiner outputs the control signal causing the first switch and the second switch to conduct the demodulated signal. The first and second decoders thereby output the decoded signal having the intended communication quality maintained.

According to the multi-mode receiver circuit of the present invention, the shared receiver receives a signal formed according to one of various modulation and communication systems to output a received signal. The signal intensity detector detects the electric power value, or absolute value of the amplitude, of the received signal to output a detected signal. The determiner compares the magnitude of the detected signal with a plurality of threshold voltages, and generates control signals to output the latter to switches. The switches are operated in response to the respective control signals fed to the switches so that the received signal is selectively fed to demodulators. The demodulators demodulate the received signal according to a receiving system corresponding to the modulation or transmission systems to output demodulated signals. Accordingly, even when a received signal is a modulated wave whose amplitude is small with noise involved thereon, the possibility of the input path of the modulated wave to the demodulator or decoder being conducted in error can be suppressed. This can prevent wasteful operation of the demodulator or decoder, so that a reduction in power consumption and simplification of the processing of results of demodulation and decoding can be achieved. Besides, the multi-mode receiver circuit of the present invention is capable of suppressing the outputting of demodulation or decoding results that would otherwise be degraded in communication quality, so that it can obtain demodulation or decoding results while maintaining intended communication quality.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
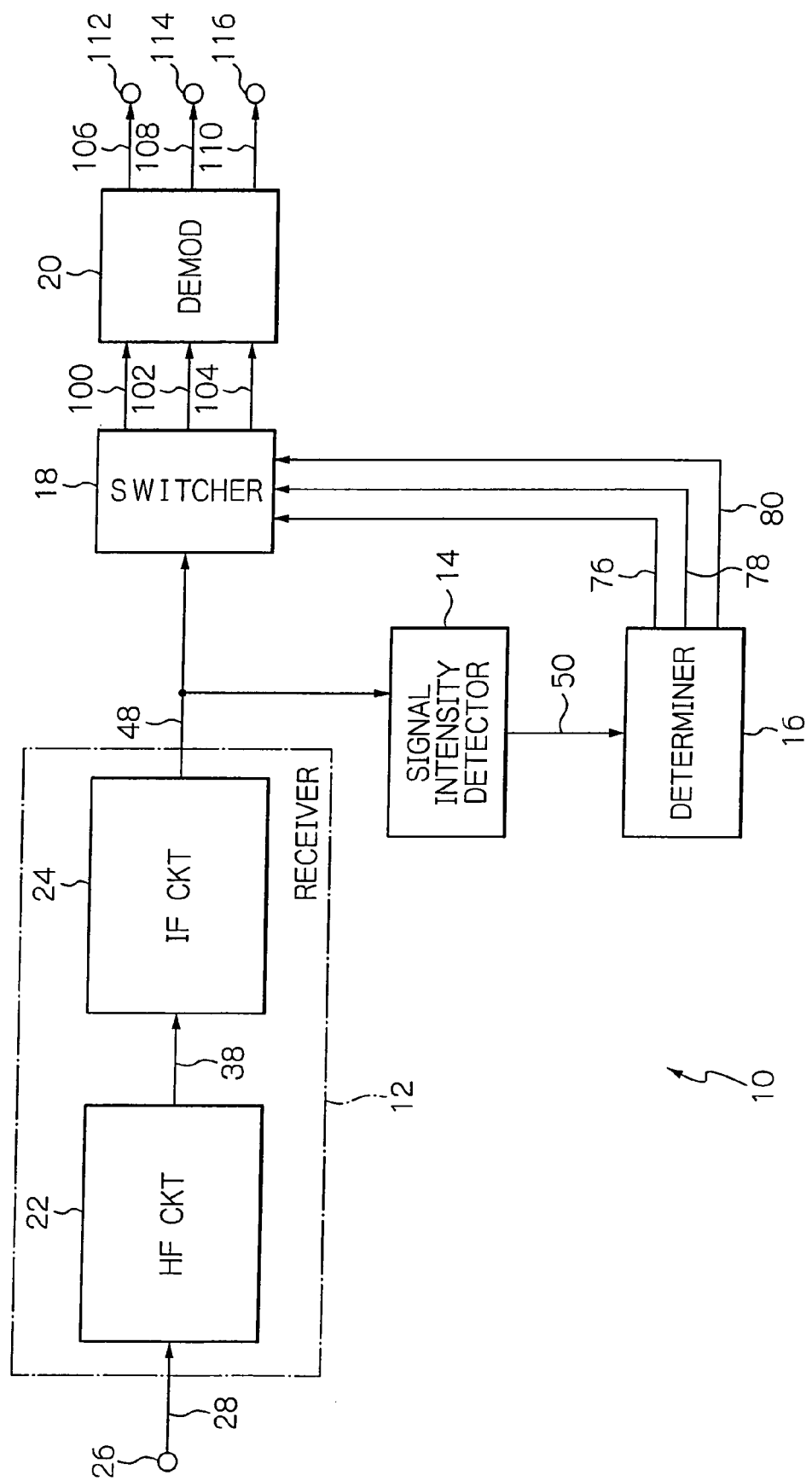
FIG. 1 is a schematic block diagram showing an illustrative embodiment of a receiver set to which a multi-mode receiver circuit: according to the present invention is applied.

Preferred embodiments of a multi-mode receiver circuit according to the present invention will hereinafter be described in detail with reference to the accompanying drawings. Referring initially to FIG. 1, a first preferred embodiment of the multi-mode receiver circuit of the present invention is configured such that a shared receiver 12 receives a signal formed according to any one of various modulation or communication systems to output a received signal 48, a signal intensity detector 14 detects or determines the electric power value, or absolute value of the amplitude, of the received signal 48 to output a detected signal 50, a determiner 16 compares the magnitude of the detected signal 50 with a plurality of threshold voltages, not shown, and generates control signals 76, 78 and 80 to output the latter to a switcher 18, the switcher 18 is operated in response to the control signals 76, 78, and 80 fed to the switcher 18 so that the received signal 48 is responsively fed or conducted and interrupted to a demodulator (DEMOD) 20 which in turn demodulates the received signal in compliance with a receiving system corresponding to the modulation or transmission systems to output demodulated signals 106, 108, and 110.

Accordingly, even when a received signal is a modulated wave whose amplitude is small with noise involved thereon, the multi-mode receiver circuit is able to suppress the possibility of the input path of the modulated wave to the demodulator 20 or decoder 122 which would otherwise be rendered operative in error. This can prevent wasteful operation of the demodulator 20 or decoder 122, and hence reduce power consumption and simplify the processing of demodulating and decoding results. The multi-mode receiver circuit of the present embodiment can further suppress the outputting of a demodulation or decoding result from being degraded in communication quality. As a result, the multi-mode receiver circuit can obtain a demodulation or decoding result, while maintaining intended communication quality.

In the illustrative embodiment, the multi-mode receiver circuit is applied to a receiver set 10. Note that parts not directly relevant to understanding of the present invention will neither be described nor shown for avoiding redundancy. The receiver set 10 of the illustrative embodiment is a multi-mode receiver circuit, and includes, as shown in FIG. 1, the shared receiver 12, signal intensity detector 14, determiner 16, switcher 18, and demodulator 20, which are interconnected as illustrated.

The shared receiver 12 has the function of receiving a signal 28 formed and transmitted according to any one of plural types of modulation or transmission system to output the received signal on its output 48. It is noted in the following description that signals are given the same reference numerals as the connecting lines over which the signals are transmitted. The receiver 12, as shown in FIG. 1, includes a high-frequency (HF) circuit 22 and an intermediate-frequency (IF) circuit 24, which are interconnected as depicted. The receiver 12 functions to receive, for example, a radio signal in the band of 5 GHz by means of a receiving antenna, not shown, interconnected to its input port 26. The high-frequency input signal 28 received on the input terminal 26 is fed to the high-frequency circuit 22 over a connection 38.

Figure 2:
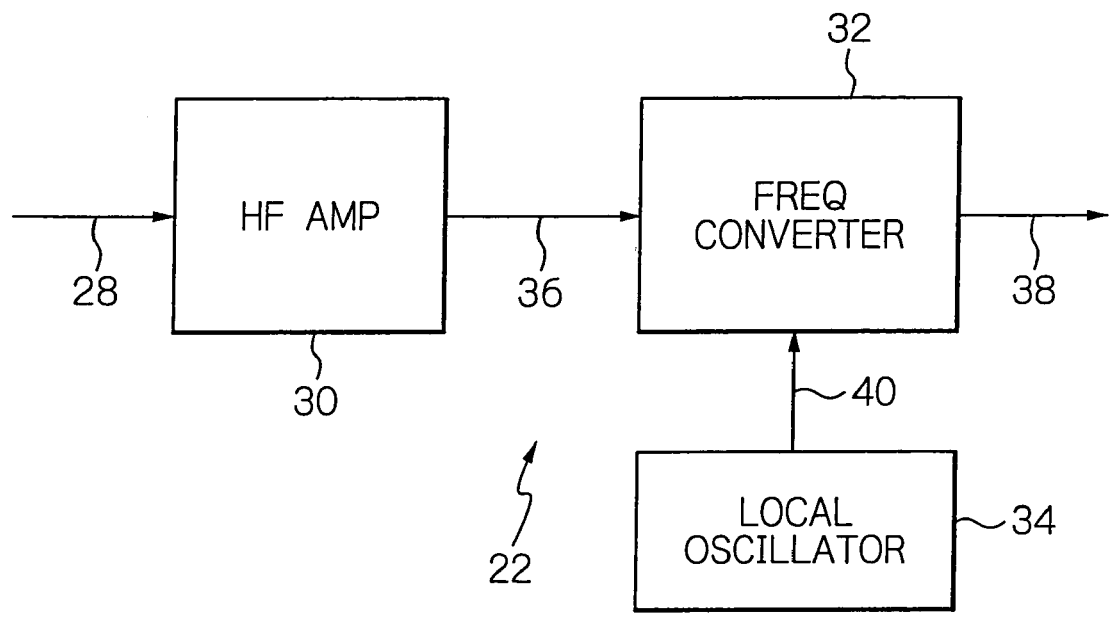
FIG. 2 is a schematic block diagram showing the high-frequency circuit of a receiver included in the receiver set shown in FIG. 1.

The high-frequency circuit 22 functions as a down-converter that converts the received signal 28 to a lower frequency. The high-frequency circuit 22, as shown in FIG. 2, includes a high-frequency amplifier 30, a frequency converter 32, and a local oscillator 34, which are interconnected as illustrated. The high-frequency amplifier 30 has the property of amplifying at least a predetermined high-frequency band in the received signal 28. The high-frequency amplifier 30 amplifies the received signal 28 and feeds the amplified high-frequency signal 36 to the frequency converter 32.

The frequency converter 32 has the function of frequency-converting the incoming high-frequency signal 36 into an intermediate-frequency signal. The frequency converter 32 is adapted to convert the high-frequency signal 36, for instance, in the band of 5 GHz into an intermediate-frequency signal 38 in the band of 40 MHz to output the resultant signal 38.

The local oscillator 34 has the function of self-running to oscillate an output clock signal 40 having a predetermined oscillation frequency. The local oscillator 34 feeds the oscillating clock signal 40 to the frequency converter 32. In response to the incoming clock signal 40, the frequency converter 32 converts, i.e. down-converts, high-frequency signal 36 into the intermediate-frequency signal 38.

Figure 3:
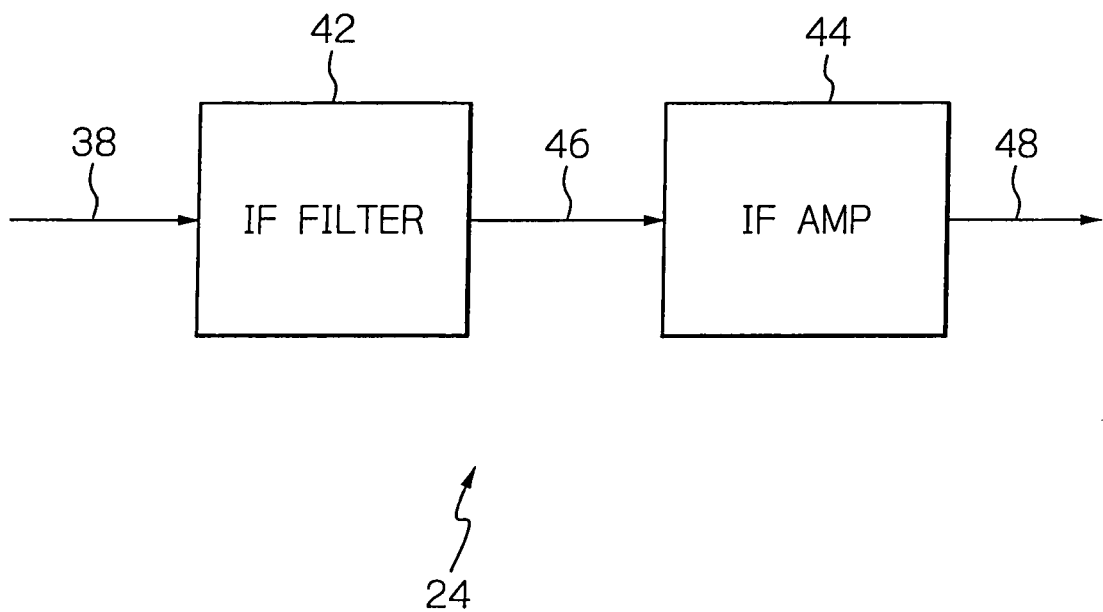
FIG. 3 is a schematic block diagram showing the intermediate-frequency circuit of the receiver included in the receiver set shown in FIG. 1.

Now referring to FIG. 3, the intermediate-frequency circuit 24, FIG. 1, includes an intermediate-frequency filter 42 and an intermediate-frequency amplifier 44, which are interconnected as shown in FIG. 3. The intermediate-frequency circuit 24 generally has the functions of selectively passing only a predetermined frequency of the incoming intermediate-frequency signal 38 and amplifying the thus selected signal.

For that aim, the intermediate-frequency filter 42 is provided to select only a desired band of waves from the incoming intermediate-frequency signal 38. The intermediate-frequency filter 42 outputs the selected signal 46 to the intermediate-frequency amplifier 44. The intermediate-frequency amplifier 44 has the property of amplifying at least a predetermined intermediate frequency band in the incoming signal 46. The intermediate-frequency amplifier 44 amplifies the incoming signal 46 and feeds the amplified intermediate-frequency signal 48 to the signal intensity detector 14 and switcher 18, FIG. 1.

Returning again to FIG. 1, the signal intensity detector 14 has the function of determining or measuring the intensity of a received signal to output the result of determination. For example, the signal intensity detector 14 determines the electric power value, i.e. the absolute value of the amplitude, of the received signal 48, and hence the signal 28. The signal intensity detector 14 is responsive to the incoming signal 48 to output to the determiner 16 a voltage signal 50 proportional to the signal intensity of the received signal, the signal 50 representing the absolute value of the amplitude of the received signal.

Figure 4:
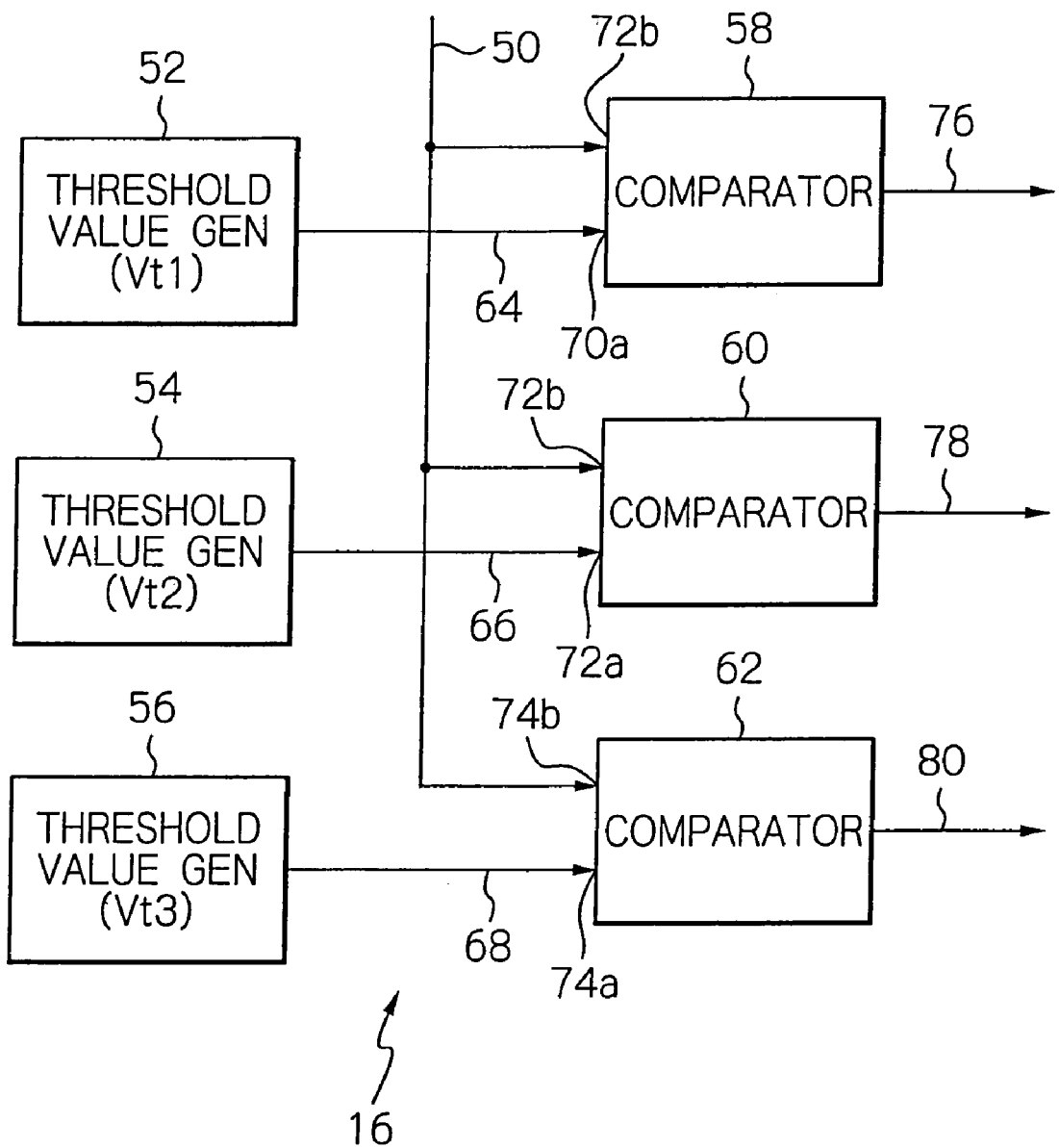
FIG. 4 is a schematic block diagram showing a determiner included in the receiver set shown in FIG. 1.

The determiner 16 has the function of determining whether or not the signal intensity of a received signal exceeds a desired signal level, and generating control signals which control the operation of the switcher 18 according to the result of decision. The determiner 16, as shown in FIG. 4, includes threshold value generators 52, 54 and 56, and comparators 58, 60 and 62, which are interconnected as illustrated. The threshold value generators 52, 54, and 56 have respective threshold voltages Vt1, Vt2, and Vt3, which are different in value from each other so that the threshold voltage Vt1 is set smaller than Vt2, which is set smaller than Vt3, i.e. Vt1<Vt2<Vt3.

The threshold voltages Vt1, Vt2 and Vt3 are set as the absolute values of the received signal intensity or amplitude required for respective unit demodulators 94, 96 and 98, FIG. 5, dedicated for the respective signal formats, which will be described later, to develop demodulated signals 106, 108 and 110, respectively, having intended communication quality. More specifically, the threshold voltages Vt1, Vt2 and Vt3 take values corresponding to input signal intensities of −70 dBm, −65 dBm and −60 dBm, respectively.

The threshold value generators 52, 54, and 56 function to feed the threshold voltages Vt1, Vt2, and Vt3, which are set under the control not specifically described, to the first input terminals 70a, 72a, and 74a of the comparators 58, 60, and 62 as threshold value signals 64, 66, and 68, respectively.

The comparators 58, 60, and 62 have the function of comparing the signal 50 representing the intensity of the received signal with the threshold voltages Vt1, Vt2, and Vt3, respectively, provided on one input terminals 70a, 72a, and 74a to produce control signals 76, 78, and 80 which will perform an ON/OFF operation on the switcher 18 according to the results of comparison. The comparators 58, 60, and 62 receive the signal 50 on the other input terminals 70b, 72b, and 74b thereof, respectively. The comparators 58, 60, and 62 compare the incoming signal 50 with the threshold voltages Vt1, Vt2, and Vt3 to produce the control signals 76, 78, and 80 according to the results of comparison, respectively. As shown in FIG. 1, the comparators 58, 60, and 62 output the generated control signals 76, 78, and 80 to the switcher 18, respectively. While the illustrative embodiment employs the plurality (e.g. three) of threshold value generators 52, 54, and 56 and the corresponding plurality of comparators 58, 60, 62, the present invention may be applied to the provision of a single threshold value generator and a single comparator.

Figure 5:
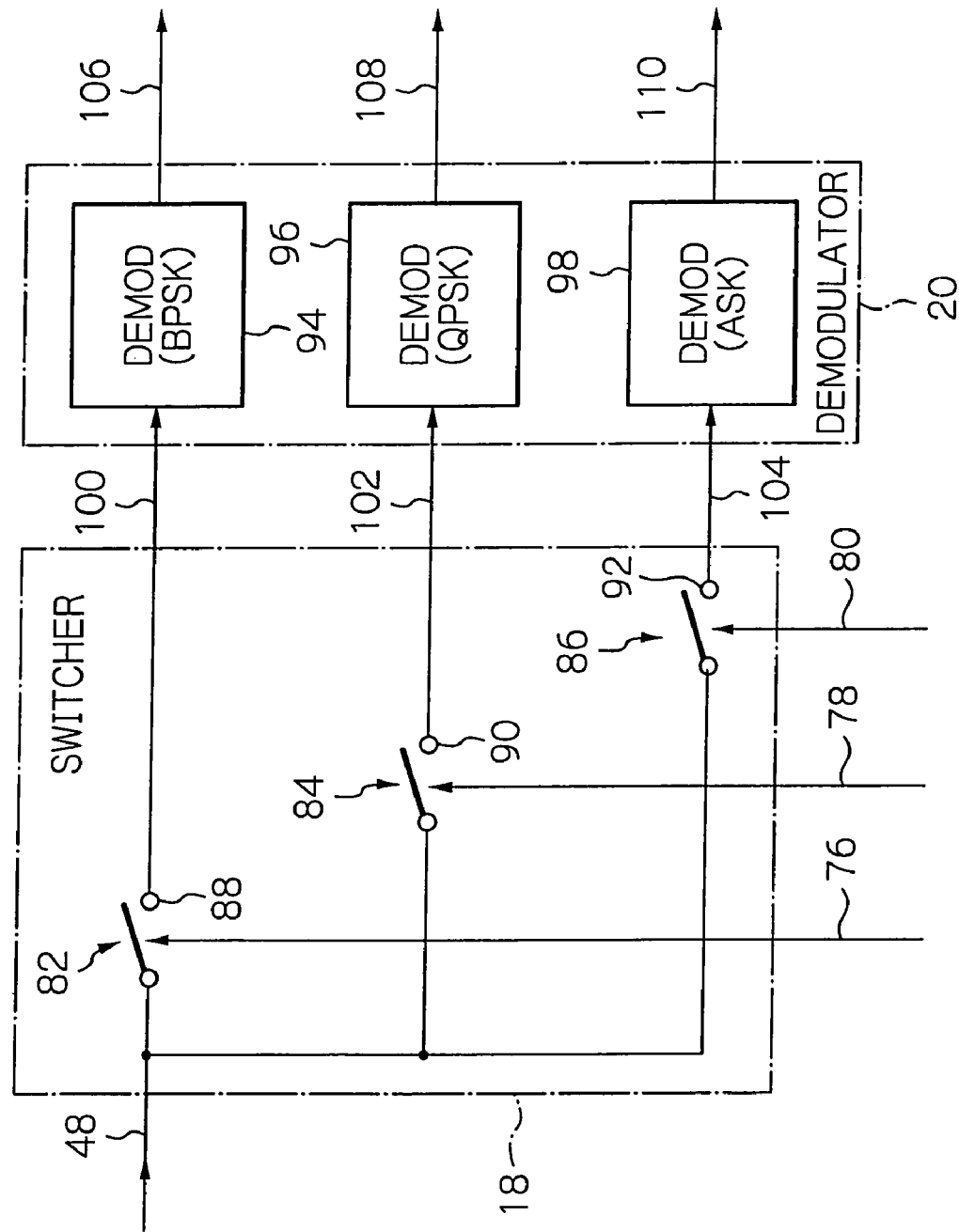
FIG. 5 is a schematic block diagram showing a switcher and a demodulator that are included in the receiver set shown in FIG. 1.

The switcher 18 comprises a plurality of switches 82, 84 and 86, FIG. 5, and has the function of being responsive to the incoming control signal 76, 78 and 80, respectively, to selectively conduct the received signal 48 to none or appropriate one or ones of the output ports 100, 102 and 104. The switcher 18, as shown in FIG. 5, includes three switches 82, 84, and 86. Each of the switches 82, 84 and 86 may be implemented by a semiconductor switching device such as a transistor. The switches 82, 84, and 86 control themselves in terms of conductive and non-conductive (ON/OFF) operation to selectively feed the incoming intermediate-frequency signal 48 to the demodulator 20 in response to the control signals 76, 78, 80 that are supplied as switching signals. The switches 82, 84, and 86 have output terminals 88, 90, and 92 connected to the demodulator 20.

The demodulator 20 has the function of demodulating the incoming signal 48 in the receiving system corresponding to the modulation or transmission system used to output a demodulated signal on appropriate one or ones of the output ports 106, 108 and 110. For that aim, the demodulator 20 is formed by unit demodulators 94, 96, and 98 disposed correspondingly to switches 82, 84, and 86. The unit demodulators 94, 96, and 98 are disposed in the ascending order of the magnitude of the received signal intensity which is used in outputting a demodulated signal 106, 108 or 110 with intended communication quality.

The unit demodulators 94, 96, and 98 in the illustrative embodiment are connected to receive signals 100, 102, and 104, which respectively have selected levels, through the switches 82, 84, and 86, respectively. The unit demodulators 94, 96, and 98 demodulate these input signals 100, 102, and 104, and output demodulated signals 106, 108, and 110 on output terminals 112, 114, and 116, FIG. 1, respectively.

In the illustrative embodiment, the third unit demodulator 98 in FIG. 5 from the top is adapted for demodulating a received signal in a signal format in which the received signal intensity is greatest and which is used to output the demodulated signal 110 with intended communication quality. The first unit demodulator 94 is adapted for demodulating a received signal in a signal format in which the received signal intensity is smallest and which is used to output the demodulated signal 106 with intended communication quality. More specifically, the first, second and third unit demodulators 94, 96 and 98 are directed to BPSK, QPSK and ASK modulations, respectively.

The illustrative embodiment is applicable to, in addition to BPSK, QPSK, and ASK modulation systems, DQPSK (Differential Quadrature Phase Shift Keying), FSK (Frequency Shift Keying), OOK (On/Off Keying), QAM (Quadrature Amplitude Modulation), AM (Amplitude Modulation), FM (Frequency Modulation), PM (Phase Modulation) modulation systems, and so forth. It is also noted that the present invention may be applied not only to the single demodulator 20 but also to a plurality of demodulators, as will be described later.

Operation of the receiver set 10 in the illustrative embodiment will now be described in detail. A high-frequency signal 28 in the band of 5 GHz is input through the antenna terminal 26 and is amplified by the high-frequency amplifier 30. Then, using the oscillating clock signal 40 from the local oscillator 34, the amplified high-frequency signal 28 is converted in the frequency converter 32 into an intermediate-frequency signal 38 in the band of 40 MHz. Only a desired band of waves of the intermediate-frequency signal 38 is selectively filtered by the intermediate-frequency filter 42, and thereafter it is amplified by the intermediate-frequency amplifier 44.

The intermediate-frequency signal 48 output from the intermediate-frequency amplifier 44 is received by the signal intensity detector 14, which in turn produces a voltage signal 50 proportional to the signal intensity of the signal 28 received through the antenna terminal 26. The voltage signal 50 developed from the signal intensity detector 14 is input to the comparators 58, 60, and 62, FIG. 4. In the comparators 58, 60, and 62, the voltage signal 50 is compared with the threshold voltages Vt1, Vt2, and Vt3 generated by the threshold value generators 52, 54, and 56, respectively. In response to the results of comparison, the comparators 58, 60, and 62 generate control signals 76, 78, and 80, respectively. The control signals 76, 78, and 80 control the ON/OFF operation of the switches 82, 84, and 86 according to their signal levels.

The intermediate-frequency signal 48 provided from the intermediate-frequency amplifier 24 is split in the three ways so as to be fed to the switches 82, 84, and 86, FIG. 5. The intermediate-frequency signal 48 is input to one or ones of the unit demodulators 94, 96, and 98 interconnected correspondingly to the switches 82, 84, and 86 when rendered to the ON or conducting state thereof. Upon receiving the intermediate-frequency signal 48, i.e. signals 100, 102, and 104 selected, the unit demodulators 94, 96, and 98 output demodulated signals 106, 108, and 110 from their output terminals 112, 114, and 116, respectively.

When the signal intensity of the received signal 28 is $-70$ dBm or less, assume that there is no input signal. In this case, the intermediate-frequency signal 48 is small and the voltage signal 50 from the signal intensity detector 14 is low, so that the control signals 76, 78, and 80 from the comparators 58, 60, and 62 indicate the non-active state thereof. This causes the switches 82, 84, and 86 to be in the OFF or cut-off state thereof. As a result, the unit demodulators 94, 96, and 98 do not operate and therefore do not develop any significant output signal on the output ports 106, 108, and 110 thereof.

For example, if the signal level of the received signal 28 increases gradually to values of $-70$ dBm, $-65$ dBm, and $-60$ dBm in this order, the first comparator 58 first outputs the control signal 76 having its active state. This causes the first switch 82 to be in its ON or conducting state, whereby the intermediate-frequency signal 100 is applied to the first unit demodulator 94.

Subsequently, the signal level increases gradually, so that the second and third comparators 60 and 62 output control signals 78 and 80 having the active state thereof, respectively. This cause, the second and third switchers 84 and 86 to be rendered in the ON or conductive state thereof, whereby the intermediate-frequency signals 102 and 104 are applied to the second and third unit demodulators 96 and 98 in the recited order.

As a result, when the signal level of the input signal 28 is equal to $-70$ dBm or higher, the intermediate-frequency signal 100 is applied to the BPSK demodulator 94. When it is equal to $-65$ dBm or higher, the intermediate-frequency signal 102 is applied to the QPSK demodulator 96. When it is equal to $-60$ dBm or higher, the intermediate-frequency signal 104 is applied to the ASK demodulator 98.

Accordingly, in the case of the incoming high-frequency signal 28 being of BPSK modulation, if its signal intensity is equal to $-70$ dBm or higher, the signal 100 is applied from the first switcher 82 to the first modulator 94, from which a demodulated output 106 is obtained. Likewise, in the case of QSPK modulation, if its signal intensity is equal to $-65$ dBm or higher, the signal 102 is applied from the second switcher 84 to the second modulator 96, from which a demodulated output 108 is obtained. In the case of ASK modulation, if its signal intensity is equal to $-60$ dBm or higher, the signal 104 is applied from the third switcher 86 to the third modulator 98, from which a demodulated output 110 is obtained.

Since the receiver set 10 operates in the manner described above, it can be operated according to the characteristics of modulation systems such as BPSK, QPSK, and ASK modulations. The signal intensity, which causes communication quality such as an error rate characteristic to be an intended level, depends upon the modulation system used, so that a higher level of input signal is employed in the order of BPSK, QPSK, and ASK modulations. Conventionally, only the inputting of the high-frequency signal 28 could not specify which of the modulation systems is used, which will be determined when being demodulated. In the illustrative embodiment, however, when signal intensity is weaker, the receiver set 10 operates only the BPSK modulator 94 capable of receiving even a signal whose signal intensity is thus weaker. In the case of a signal whose signal intensity is sufficiently high, the three kinds of unit demodulators 94, 96, and 98 are rendered operative. Thus, wasteful operation of the unit demodulators 94, 96, and 98 is prevented, and the illustrative embodiment is therefore capable of reducing the power consumption and simplifying the processing of demodulation results.

With mobile radio equipment such as a cellular phone and vehicle-mounted radio equipment, in an application where communication is established according to the modulation or communication system of another party moving nearby, or in an application where the local oscillator 34 scans a great number of transmission channels and has a plurality of modulation or communication systems in the sweeping range thereof, the illustrative embodiment can reduce wasteful demodulation, because it does not perform ASK modulation on weak signals. Thus, it is possible to reduce power consumption and to shorten the time required for communication establishment and scanning time.

Particularly, compared with the aforementioned Japanese patent laid-open publication No. 284554/1999, the illustrative embodiment is capable of outputting demodulated signals, while maintaining intended communication quality. Compared with the aforementioned Japanese patent laid-open publication No. 2002-368829, the illustrative embodiment detects the electric power value, or absolute value of the amplitude, of a received signal by the signal intensity detector 14. Accordingly, even when the received signal 28 is a SPSK wave whose amplitude is small with noise involved thereon, the illustrative embodiment is capable of suppressing the possibility of the input of the received signal to the unit demodulator 98, which corresponds to ASK waves, being conducted in error.

As compared with the above '554 and '829 publications, in the illustrative embodiment, when the intensity of the received signal 28 has a value between the threshold voltages Vt1 and Vt2, only an input path to the unit demodulator 94 corresponding to the BPSK modulation system is connected. If the modulation system of the received signal 48 is BPSK modulation, the unit demodulator 94 outputs a demodulated signal 106, while maintaining an intended communication quality. Conversely, when the modulation system of the received signal 48 is QPSK or ASK modulation, an input path to the unit demodulator 96 or 98 is intercepted and therefore there is no possibility that the unit demodulator 96 or 98 will output a demodulated signal 108 or 110 without maintaining intended communication quality. This renders it possible to prevent the outputting of a demodulated signal whose communication quality has been degraded.

A description will now be given of a simplified configuration of an alternative, or second, embodiment of the receiver set 10 to which the multi-mode receiver circuit of the present invention is applied. Like parts are designated with the same reference numerals, and a detailed description thereon will not be repeated for avoiding redundancy.

Figure 6:
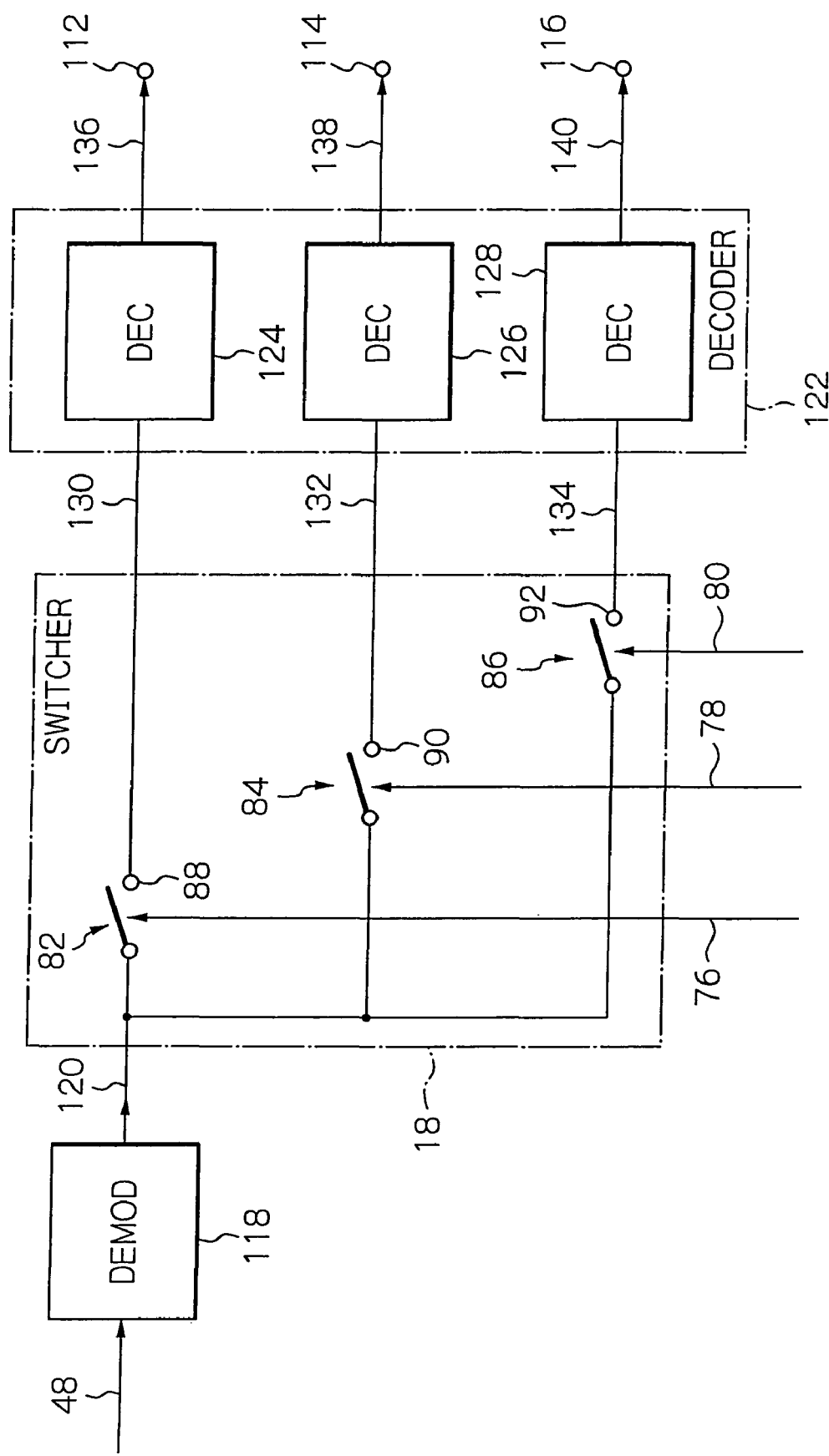
FIG. 6 is a schematic block diagram showing an alternative embodiment of the receiver set according to the present invention.

The receiver set 10 of the alternative embodiment is shown in FIG. 6, which includes elements differing from the preceding embodiment shown in and described with reference to FIG. 5. The receiver set 10 of the alternative embodiment is specifically featured with a demodulator 118 being interconnected between the receiver 12 and switcher 18 of the preceding embodiment. The demodulator 118 comprises a single unit demodulator, for example, a PSK (Phase Shift Keying) demodulator. This demodulator 118 is connected to output a demodulated signal 120 to the switcher 18.

The receiver set 10 further has a decoder 122 interconnected between the output terminals 88, 90, and 92 of the switches 82, 84, and 86 and the output terminals 112, 114, and 116 of the receiver set 10. The decoder 122 includes, for instance, unit decoders 124, 126, and 128 that correspond to three coding systems. The unit decoders 124, 126, and 128 receive demodulated signals 130, 132, and 134 that are output from the switches 82, 84, and 86, respectively, when they are in their ON or conducting state.

To the alternative embodiment, applicable as a coding system are various diffusion coding systems as well as a Manchester coding system, mBnB coding system, and others.

The configuration of the alternative embodiment is based on the assumption that in communication systems used in radio communication, it is a common practice to modulate the original data after being coded. Because on the receiver side coded signals are decoded after demodulated, the alternative embodiment is configured as described above.

As examples of coding, preferred examples of diffusion coding are as follows. In the case of employing the BPSK demodulator 94 shown in FIG. 1, it is preferable to use the diffusion-coding unit decoder 124 adapted to the code length "7". In the case of employing the QPSK demodulator 96, it is preferable to use the diffusion-coding decoder 126 adapted to the code length "15". In the case of employing the ASK demodulator 98, it is preferable to use the diffusion-coding decoder 128 adapted to the code length "7". In the instant alternative embodiment, as described later, each switch of the switcher 18 is switched over based on the result of decision obtained according to a combination of code length and signal intensity. The unit decoders 124, 126, and 128 are adapted to decode the incoming demodulated signal 120 to output decoded signals 136, 138, and 140, respectively.

Note that while the alternative embodiment employs the single decoder 122, the present invention may be applied to two or more decoders provided like the decoder 122. It is also noted that the unit decoders 124, 126, and 128 in the decoder 122 are arranged in the order of increasing signal intensity.

Operation of the alternative embodiment will now be described in detail. When the signal intensity of the received signal 28 is equal to −70 dBm or less, it is assumed that there is no input signal. In this case, the intermediate-frequency signal 48 from the intermediate-frequency amplifier 44 is small and the voltage signal 50 from the signal intensity detector 14 is low, so that the comparators 58, 60, and 62 output control signals 76, 78, and 80 that have the non-active state thereof. This causes three switches 82, 84, and 86 to be in the OFF or non-conducting state thereof. As a result, three unit decoders 124, 126, and 1283 do not operate and hence do not produce any significant output signal on the output ports thereof.

For instance, if the signal level of the received signal 28 increases progressively to the values of −70 dBm, −65 dBm, and −60 dBm, the first comparator 58 first outputs the control signal 76 having its active state. This causes the first switcher 82 to be in its ON or conducting state, whereby the demodulated signal 130 is applied from the first switcher 82 to the first unit decoder 124.

Subsequently, the signal level increases progressively, so that the second and third comparators 60 and 62 output control signals 78 and 80 having the active state thereof. This causes the second and third switchers 84 and 86 to be in the ON or conducting state thereof, whereby the demodulated signals 132 and 134 are applied in the order of second and third unit decoders 126 and 128 via the second and third switchers 84 and 86.

For example, when the signal level of the input signal 28 is equal to −70 dBm or higher, the demodulated signal 130 is applied to the first unit decoder 124 for a diffusion code of code length "21". When it is equal to −65 dBm or higher, the demodulated signal 132 is applied to the second unit decoder 126 for a diffusion code of code length "15". When it is equal to −60 dBm or higher, the demodulated signal 134 is applied to the third unit decoder 128 for a diffusion code of code length "7".

Accordingly, in the case where the received signal 28 is a PSK signal which employs a diffusion code of code length "21" and whose signal intensity is equal to −70 dBm or higher, decoded data 136 is obtained from the first unit decoder 124. Similarly, in the case where a PSK signal employing a diffusion code of code length "15" has a signal intensity of −65 dBm or higher, decoded data 138 is obtained from the second unit decoder 126. In the case where a PSK signal employing a diffusion code of code length "7" has a signal intensity of −60 dBm or higher, decoded data 140 is obtained from the third unit decoder 128.

Since the receiver set 10 operates in this manner, it can be operated according to the characteristics of the diffusion code modulation systems that are different in code length, such as 21, 15, and 7. The longer the code length of a diffusion code, the higher the processing gain in the reverse diffusion, or decoding, process. Therefore, in order to obtain intended communication quality such as an error rate characteristic, if the code length becomes shorter, a higher level input signal will be employed. The unit decoders 124, 126, and 126 in the decoder 122 are disposed in the order of increasing signal intensity.

When the received signal 28 is merely input, the coding system used is not definite, but will be fixed when decoded. In the alternative embodiment, when signal intensity is weaker, the receiver set 10 operates only the first unit decoder 124 corresponding to a longer code length "21" which is capable of receiving even a signal whose signal intensity is weaker. In the case of a signal whose intensity is sufficiently strong, the receiver set 10 renders the three kinds of unit decoders 124, 126, and 128 operable. Thus, wasteful operation of the unit decoders 124, 126, and 128 is prevented, so that the alternative embodiment is capable of reducing power consumption and simplifying the processing of the results of decoding.

Accordingly, the alternative embodiment does not perform a wasteful decoding operation in which the decoding of a signal whose code length is short is performed on weak signals, thereby being able to minimize wasteful decoding. As a result, the alternative embodiment is capable of reducing power consumption, and shortening the time required for communication establishment and the scanning time.

Figure 7:
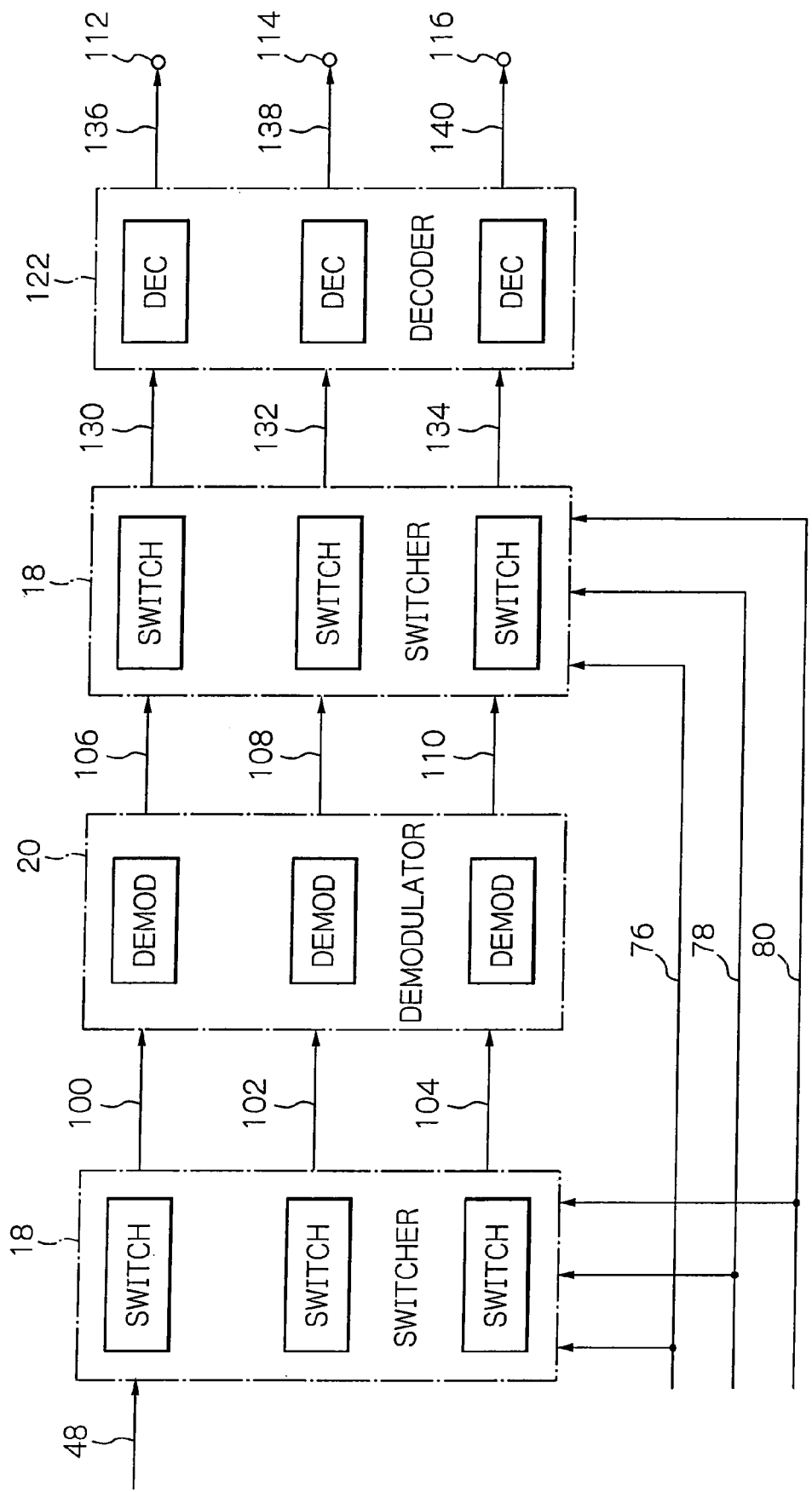
FIG. 7 is a schematic block diagram showing another alternative embodiment of the receiver set according to the present: invention.

A description will hereinafter be given of a simplified configuration of another alternative embodiment of the receiver set 10 to which the multi-mode receiver circuit of the present invention is applied. As shown in FIG. 7, the other, or third, alternative embodiment may combine together the modulation system of the first embodiment with the coding system of the alternative embodiment described just above.

The third embodiment includes two switchers, corresponding to the switcher 18 shown in FIG. 1, and the demodulator 20 of the first embodiment and the decoder 122, FIG. 6, of the second embodiment are interconnected as depicted in FIG. 7. Specifically, in the order from the left toward the output terminals 112, 114, and 116 in FIG. 7, the switcher 18, demodulator 20, switcher 18 and decoder 122 are arranged, and the two switchers 18 are controlled by control signals 76, 78, and 80.

The third embodiment thus configured makes it possible to possess advantages that are obtained from the combination of first and second embodiments.

Figure 8:
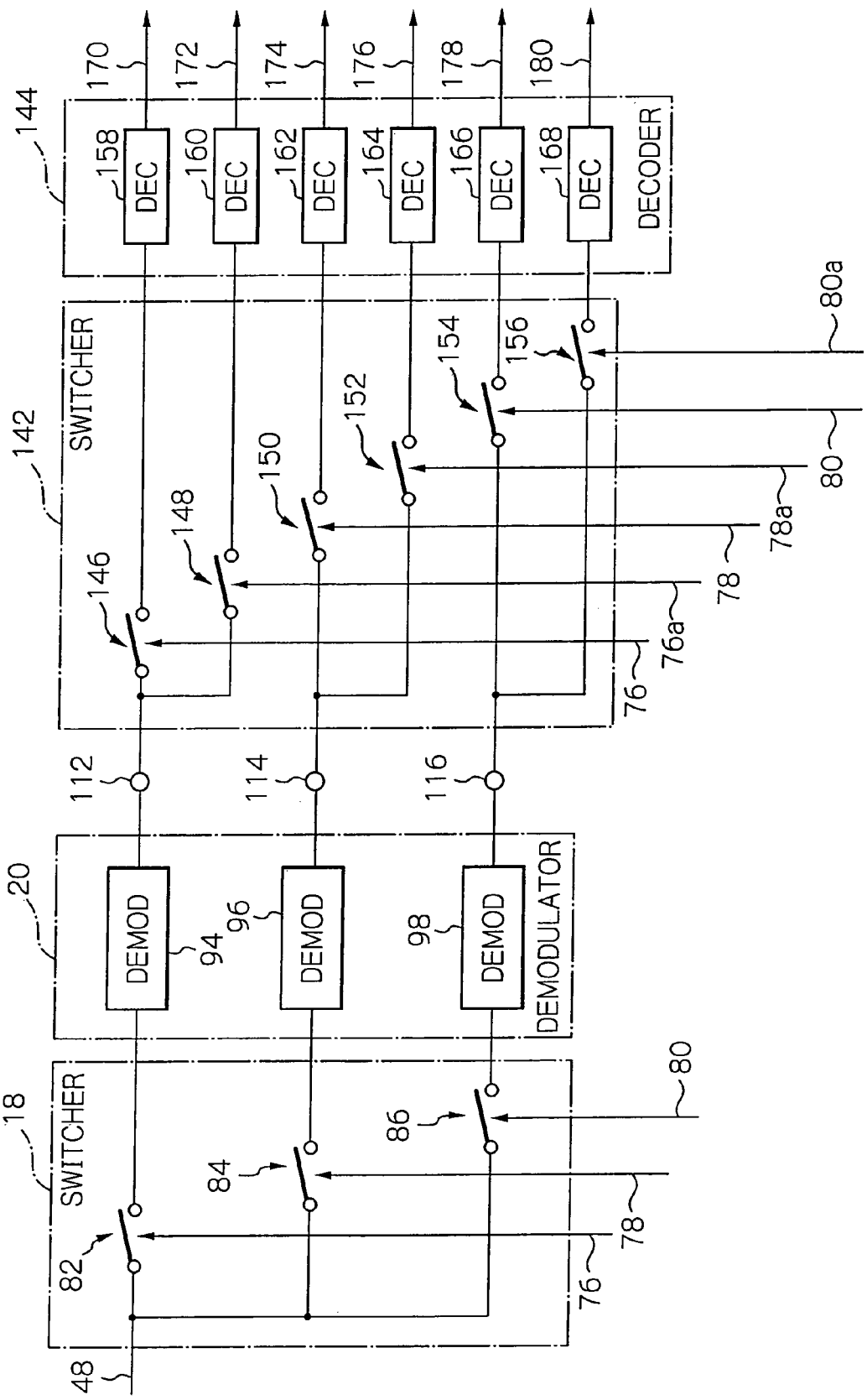
FIG. 8 is a schematic block diagram showing still another alternative embodiment of the receiver set according to the present invention.

Further, as shown in FIG. 8, the receiver set 10 may be configured such that an additional switcher 142 and an additional decoder 144 are disposed after the output terminals 112, 114, and 116. In this alternative embodiment, two switches are provided for each demodulated signal, so that the switcher 142 includes six switches 146 to 156. The decoder 144 similarly includes six unit decoders 158 to 168, which are adapted to output decoded data 170 to 180, respectively. The switchers 146 to 156 may be adapted to control to switch seven switching states, in which control signals 76a, 78a, and 80a are added to the control signals 76, 78, and 80, by setting six threshold values to the determiner 16, using the signal intensity of a PSK signal that employs a predetermined code length. The control signals 76a, 78a, and 80a are also generated in a determiner for decoding, although not shown.

While the illustrative embodiments applicable to modulation and coding systems have been disclosed, the multi-mode receiver circuit of the present invention is not to be limited to these specific illustrative embodiments. The receiver set 10 may be configured to separately be provided with processing circuits according to communication systems which are different in frame structure and preamble bits, different in unique word bits, and different in data transmission rate. In addition, the multi-mode receiver circuit of the present invention is applicable not only to wireless transmission systems in the preceding embodiments, but also to wired transmission systems.

Effective applications of the multi-mode receiver circuit of the present invention may be multi-mode cellular phones, multi-mode wireless LAN (Local Area Network) equipment, multi-mode radio or television sets, narrow-band communications systems, wiretapping-device detecting systems, and so forth. It is also applicable to standard radio receiver sets for radio timekeepers that are the same in modulation system but different in code pattern between countries.

The entire disclosure of Japanese patent application No. 2006-192903 filed on Jul. 13, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A multi-mode receiver circuit comprising:
    a shared receiver for receiving an input signal formed according to one of a plurality of modulation and communication systems to output a received signal;
    a detector for detecting a signal intensity of the received signal to output a detected signal representative of the signal intensity;
    a determiner having at least a first threshold value and a second threshold value set for comparing the detected signal with the first and second threshold values to output a control signal corresponding to a result of comparison, the second threshold value being higher than the first threshold value;
    a first switch operative in response to the control signal for selectively conducting the received signal to output the received signal or intercepting the received signal;
    a second switch operative in response to the control signal for selectively conducting the received signal to output the received signal or intercepting the received signal;
    a first demodulator interconnected to said first switch for demodulating the received signal, when output from said first switch, to output a demodulated signal; and
    a second demodulator interconnected to said second switch for demodulating the received signal, when output from said second switch, to output a demodulated signal;
    the first and second threshold values being set to values corresponding to the signal intensities employed when said first and second demodulators output the demodulated signals having an intended communication quality, respectively;
    said determiner outputting the control signal causing said first switch to conduct and said second switch to intercept the received signal when the signal intensity represented by the detected signal falls between the first threshold value and the second threshold value;
    said determiner outputting the control signal causing said first switch and said second switch to conduct the received signal when the signal intensity represented by the detected signal exceeds the second threshold value;
    whereby said first and second demodulators output the demodulated signal having the intended communication quality maintained.

2. The circuit in accordance with claim 1, wherein the signal intensity is an electric power value that is an absolute value of amplitude of the received signal.

3. The circuit in accordance with claim 1, further comprising:
    a third switch connected to an output terminal of said first demodulator and operative in response to the control signal for selectively conducting the demodulated signal to output the demodulated signal or intercepting the demodulated signal;
    a fourth switch connected to an output terminal of said second demodulator and operative in response to the control signal for selectively conducting the demodulated signal to output the demodulated signal or intercepting the demodulated signal;
    a first decoder operative in response to the demodulated signal output from said third switch for decoding the demodulated signal; and
    a second decoder operative in response to the demodulated signal output from said fourth switch for decoding the demodulated signal.

4. The circuit in accordance with claim 1, wherein said shared receiver comprises:
    a high-frequency circuit for receiving and amplifying a high-frequency signal which is provided as the input signal, and converting the amplified high-frequency signal to an intermediate frequency; and an intermediate-frequency circuit for selecting a predetermined frequency from the intermediate frequency to output an amplified signal as the received signal.

5. The circuit in accordance with claim 1, wherein said first demodulator demodulates the received signal according to first one of the plurality of modulation and communication systems, and said second demodulator demodulates the received signal according to second one of the plurality of modulation and communication systems.

6. A multi-mode receiver circuit comprising:
   a shared receiver for receiving an input signal formed according to one of a plurality of modulation and communication systems to output a received signal;
   a demodulator for demodulating the received signal to output a demodulated signal;
   a detector for detecting a signal intensity of the received signal to output a detected signal representative of the signal intensity;
   a determiner having at least a first threshold value and a second threshold value set for comparing the detected signal with the first and second threshold values to output a control signal corresponding to a result of comparison, the second threshold value being higher than the first threshold value;
   a first switch operative in response to the control signal for selectively conducting the demodulated signal to output the demodulated signal or intercepting the demodulated signal;
   a second switch operative in response to the control signal for selectively conducting the demodulated signal to output the demodulated signal or intercepting the demodulated signal;
   a first decoder interconnected to said first switch for decoding the demodulated signal conducted by said first switch according to a first decoding system corresponding to a first coding system and first one of the communication systems to output a decoded signal; and
   a second decoder interconnected to said second switch for decoding the demodulated signal conducted by said second switch according to a second decoding system corresponding to a second coding system and second one of the communication systems to output a decoded signal;
   the first and second threshold values being set to values corresponding to the signal intensities employed when said first and second decoders output the decoded signals having an intended communication quality, respectively;
   said determiner outputting the control signal causing said first switch to conduct and said second switch to intercept the demodulated signal when the signal intensity represented by the detected signal falls between the first threshold value and the second threshold value;
   said determiner outputting the control signal causing said first switch and said second switch to conduct the demodulated signal when the signal intensity represented by the detected signal exceeds the second threshold value;
   whereby said first and second decoders output the decoded signal having the intended communication quality maintained.

7. The circuit in accordance with claim 6, wherein the signal intensity is an electric power value that is an absolute value of amplitude of the received signal.

8. The circuit in accordance with claim 6, wherein said shared receiver comprises:
   a high-frequency circuit for receiving and amplifying a high-frequency signal which is provided as the input signal, and converting the amplified high-frequency signal to an intermediate frequency; and
   an intermediate-frequency circuit for selecting a predetermined frequency from the intermediate frequency to output an amplified signal as the received signal.

* * * * *